United States Patent [19]

Koyama et al.

[11] 4,229,093

[45] Oct. 21, 1980

[54] CONTROL DEVICE IN A SHUTTER FOR A CAMERA

[75] Inventors: Mitsuo Koyama; Tadashi Nakagawa; Masanori Watanabe; Eiichi Onda; Ichiro Nemoto, all of Yotsukaido, Japan

[73] Assignee: Seiko Koki Kabushiki Kaisha, Tokyo, Japan

[21] Appl. No.: 746,113

[22] Filed: Nov. 30, 1976

[30] Foreign Application Priority Data

Dec. 5, 1975 [JP] Japan ........................... 50-164830[U]

[51] Int. Cl.³ .............................................. G03B 9/08
[52] U.S. Cl. .................................... 354/266; 354/226
[58] Field of Search ................ 354/239, 226, 245–249, 354/250, 266

[56] References Cited

U.S. PATENT DOCUMENTS 3,276,344  10/1966  Rentschler ........................ 354/239

Primary Examiner—John Gonzales
Attorney, Agent, or Firm—Robert E. Burns; Emmanuel J. Lobato; Bruce L. Adams

[57] ABSTRACT

In a shutter control device provided with shutter blades pivoted on a 1st base-plate with film exposure opening, a control mechanism provided on the side of the opening of said 1st base-plate, a 2nd base-plate having a supporting flat surface disposed with said control mechanism thereon, and an auxiliary base-plate covering said control mechanism disposed on said 2nd base-plate. At least one of the 1st and 2nd base plates is comprised of synthetic resin.

4 Claims, 2 Drawing Figures

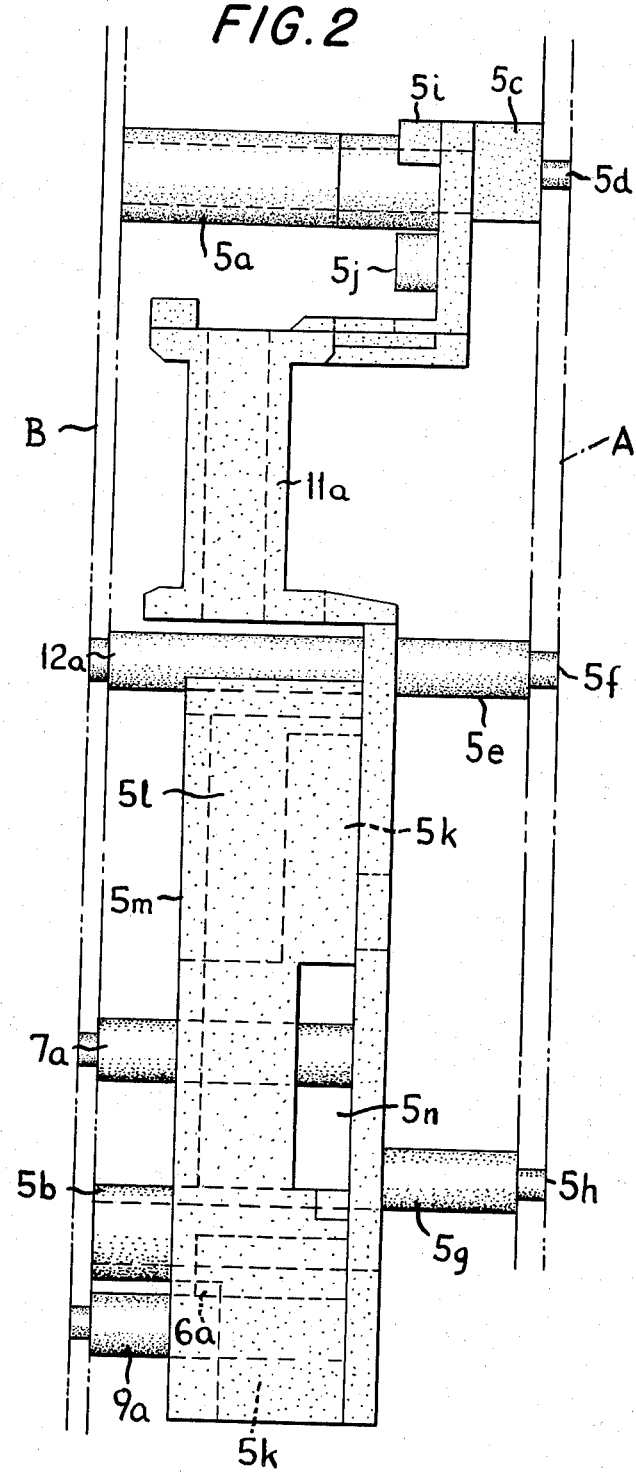

CONTROL DEVICE IN A SHUTTER FOR A CAMERA

BACKGROUND OF THE INVENTION

The present invention relates to a control device of a shutter for a camera. Generally, shutter blades will open or close an exposure aperture by operating the control device, but as a camera is minimized, such shutter will also be required to be minimized, and if a lens and a film size are considered to be constant in size, such control device must be minimized while a size of shutter aperture is kept unchanged. That is, minimizing a control device, a shutter will also be made smaller, thus cameras applying a shutter of this kind therein will be minimized.

When minimizing relatively components in each section in order to minimize a control unit, a reduction in performance will result, so by improving an accuracy of parts, a reduction in performance must be prevented. However, such procedures are not desirable in mass production. That is, they will be disadvantageous in terms of maintenance in part accuracy and production cost.

SUMMARY OF THE INVENTION

The present invention is intended to minimize a control device in view of the foregoing, and differently from minimizing each operating member of a control device relatively, by improving the supporting method of these operating members.

An object of the present invention is to provide a minimized shutter by molding a base-plate of a shutter control mechanism together with a guide portion for fixation, a supporting portion of a control member, etc. in one piece using plastic material, and by a construction reinforcing a mechanical strength of the afore-mentioned base-plate by an auxiliary base-plate forming a pair therewith.

In accordance with the objects of the present invention, there is provided a control mechanism of a shutter for a camera, which is provided with shutter blades pivoted to a 1st base-plate having an an aperture for shutter exposure operation, a control mechanism provided on the side of the opening on said 1st base-plate for adjusting exposure by operating said blades, a 2nd base-plate having a supporting flat surface disposed with said control mechanism thereon, and an auxiliary base-plate covering said control mechanism disposed on said 2nd base-plate, and in which at least one part of said 2nd base-plate comprised of plastic carries a supporting portion of an operating member of said control mechanism, and a free end of the supporting portion of said operating member is supported by the auxiliary base-plate. The embodiment according to the present invention will be described in detail with reference to the accompanying drawings.

BRIEF DESCRIPTION OF THE DRAWINGS

FIG. 2 is a fragmentary right-hand view showing a 2nd base-plate of FIG. 1.

DETAILED DESCRIPTION OF THE INVENTION

Figure 1:
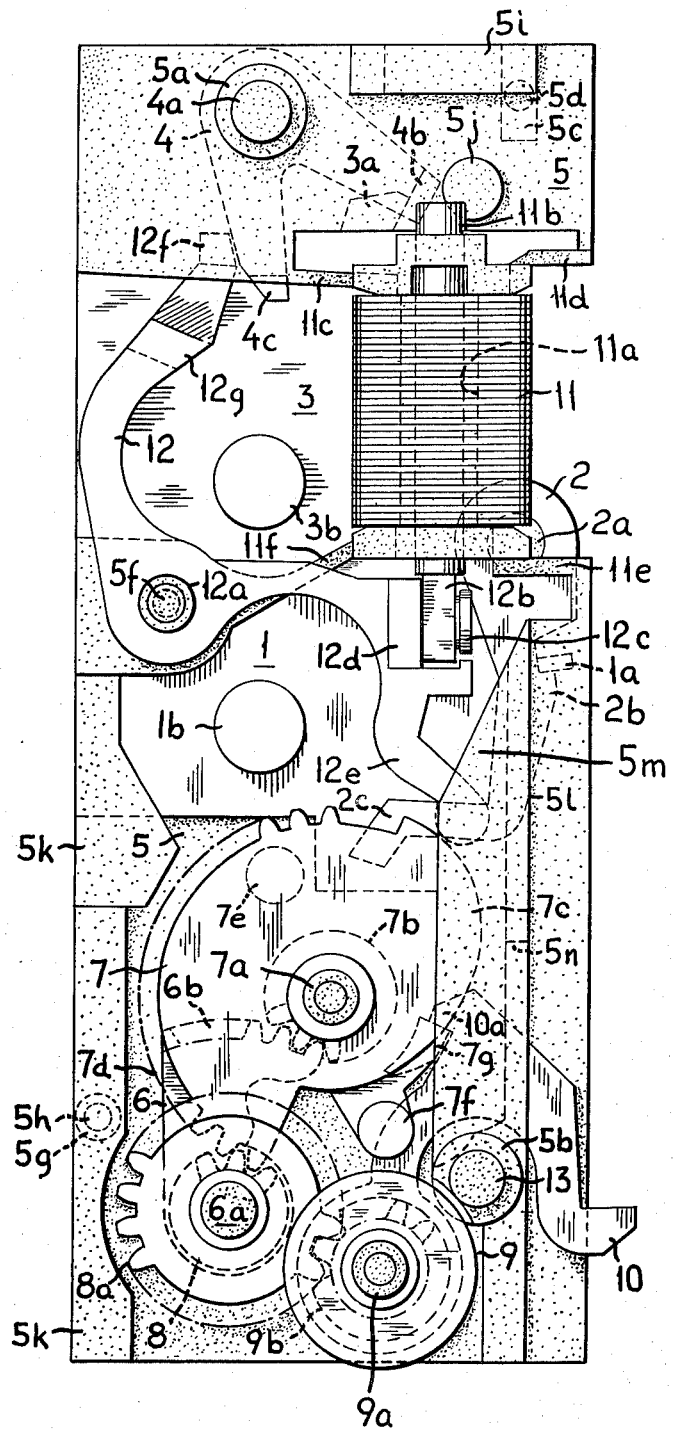
FIG. 1 is a plan view of an embodiment according to the present invention, in a state wherein a shutter has been charged.

In FIG. 1, on a 1st base-plate provided with an aperture for film exposure are pivoted releasing or opening blades starting exposure and closing blades terminating exposure, which have, however, been omitted for simplifying the drawing. For a releasing member 1 for operating the releasing blades, only a curved portion 1a is partially illustrated, which is rotatably supported to the base-plate by a shaft 1b and is mounted with an unillustrated right-hand spiral spring. A releasing pawl 2 which will lock the curved portion 1a of the releasing member in the charging position is rotatably supported to the base-plate by a shaft 2a, a hook portion 2b will be engaged with the curved portion 1a, and the pawl 2 has an operating arm 2c extendable left downward, where an unillustrated left-hand spiral spring is mounted thereon. For the closing member 3 for operating the closing blades, only a locking arm 3a is partially illustrated, which is rotatably supported to the base-plate by a shaft 3b, where an unillustrated right-hand spiral spring is mounted. A closing pawl 4 which will lock an arm 3a of the closing member in the charging position is rotatably supported to the base-plate by a shaft 4a, a curved portion 4b will be engaged with the arm 3a, having an operating arm 4c extendable downward, where an unillustrated right-hand spiral spring is mounted. The releasing member 1, the closing member 3 and their respective pawls 2 and 4 together comprise opening and closing means which is controllable for opening and closing the exposure aperture.

On a 2nd base-plate 5 carrying a control mechanism or means which controls the opening and closing means to operate the releasing blades and closing blades are formed supporting shaft members, as mentioned below in detail, and planes at each section in one unit of synthetic resin.

A set-gear 6 is fitted into a shaft 6a protruding through the 2nd base-plate 5, which is rotated leftward about the shaft 6a for the charging operation carried out in a well known manner by the prior art structure which is not illustrated. On the upper periphery of the set-gear 6 is formed a gear 6b which is meshed with a pinion 7b which is integral with a control cam 7. This control cam 7 is supported to a shaft 7a protruding through the 2nd base-plate, which is provided with a cam 7c on the right periphery, a gear 7d on the left periphery, a circular downward projection 7e provided on the upper part, a release projection 7f provided on the lower part, and an engaging step 7g extending downward, and loaded with a left-hand spiral spring (not shown).

An intermediate gear 8 is engaged with the gear 7d of the control cam 7, connected integrally with a gear 8a on the periphery, and fitted onto the shaft 6a. A flywheel 9 is supported to a shaft 9a protruding through the 2nd base-plate and connected integrally to a pinion 9b engaging with a gear 8a.

A release lever 10 is fitted onto the shaft 9a, whose hook portion 10a is engaged with the engaging step 7g of the control cam 7 and a left-hand spiral spring is loaded thereon (not shown).

A coil 11 is connected to an electric circuit, and is wound on a frame 11a formed on the 2nd base-plate, in which a magnetizable iron-core 11b is incorporated.

A control lever 12 is supported to a shaft 12a protruding through the 2nd base-plate and a magnetic portion 12b opposed to an iron-core 11b is connected to a projection 12d with a pin 12c. A tip of a press-contacting arm 12e extending right-downward abuts with the cam 7c of the control cam 7 to press the magnetic portion 12b against the iron core 11b. Further, an operating arm 12f extending upward is engaged with the operating arm 4c of the closing pawl 4, and is connected to a stepped portion 12g and operates in a different plane from the press-contacting arm 12e. Said control lever 12 is formed with synthetic resin integrally in both arms, and is loaded with a right-hand spiral spring (not shown).

The 2nd base-plate 5 is connected to the 1st base-plate A by a pipe 5a fitted onto the shaft 4a and a pipe 5b fitted onto a column 13 provided on the 1st base-plate and a tip 5d of the lower projection 5c provided on the right top, a tip 5f of the projection (see FIG. 2) extending downward of the shaft 12a and a tip 5h of the lower projection 5g provided on the left-downward part are fitted into the 1st base-plate to fix their mounting positions. On the upper side of the 2nd base-plate 5 is provided a projection 5j and a reinforcing projection 5i and the iron-core 11, and the 2nd base-plate is provided with a side-wall 5k on the left side and side-walls 5l and 5m on the right-lower part for the purpose of reinforcement of the 2nd base-plate as well as a spray-preventing wall for shielding lubricant spray. On the side-wall 5l is provided a hole 5n for the release lever 10. FIG. 2 shows the right side view of the 2nd base-plate in FIG. 1, where a 1st base-plate A and an auxiliary base-plate B are indicated with one-dotted broken lines, and the auxiliary base-plate B is fixed to shafts 4a and 13, supports a free ends of shafts 7a, 9a and 12a to cover the control mechanisms. Now, these elements operating functions will be described hereunder.

From the condition in FIG. 1, to release a camera shutter, the release lever 10 is turned rightward against a spring, and the hook portion 10a releases the engagement with the engaging step 7g to start the control cam 7. Generally, during the time until the control cam 7 starts, a supply of power to electric circuits will start, an electric current flows into the coil 11, and thus the iron-core 11b is magnetized and keeps the magnetic portion 12b in an attracted condition.

The control cam 7 will rotate leftward by virtue of a spring (not shown), the pinion 7b will engage with the gear 6b of the set-gear 6, the gear 7d will engage with the gear 8, further the gear 8a will engage with the gear 9b, and/while they are rotating the set-gear 6 and the fly-wheel 9 simultaneously, the control cam will be rotated leftward.

With operation of the control cam 7, the cam 7c will release the pressing-contact of the press-contacting arm 12e of the control lever 12 and the projection 7e will operate a time control starting contact (not shown) of the electric circuits.

The control lever 12 will set the pressing-contact of the arm 12e free, but the magnetic portion 12b is attracted to the iron-core 11b, so it will keep the condition as shown in the drawing.

In the termination period of operation of the control cam 7, the release projection 7f will engage with the operating arm 2c of the release pawl 2 to rotate it rightward, and release the engagement of the hook portion 2b and the curved portion 1a.

The release member 1 will rotate about the shaft 1b by a spring (not shown) because the engagement of the curved portion 1a is released, and start exposure by operating the release or opening blades (not shown).

When a desired period of time has elapsed, by operation of electric circuits the supply of current to the coil is interrupted, the iron-core 11b is demagnetized, thus an attracting force of the magnetic portion 12b will be eliminated so that the control lever 12 will rotate rightward by means of a spring (not shown). The press-contacting arm 12e of the control lever 12 can rotate rightward as the cam 7c is retracted, and will push an operating arm 4c of the closing pawl 4 by the operating arm 12f and, then the engagement of the curved portion 4b with the arm 3a will be released.

The closing member 3, when the arm 3a is disengaged, will rotate rightward about the shaft 3b by a spring (not shown) and terminate exposure by operating the closing blades (not shown).

In order to charge the shutter again, the release member 1 and the closing member 3 are rotated leftward against their respective spring a well known manner is in the prior art by the set lever (not shown), the curved portion 1a engages with the hook 2b of the releasing pawl 2, engage the arm 3a engages with the curved portion 4b of the closing pawl 4, and the set-gear 6 rotates leftward against a spring of the control cam 7 engages. The engaging step 7g of the control cam 7 with the hook portion 10a of the releasing lever 10, and then each member displaces to the condition of FIG. 1, and the charge will be completed.

Although the auxiliary base-plate shown in FIG. 2 is omitted in FIG. 1, it will connect at least between the shafts 4a, 12a, 7a, 9a and 13 and reinforces free ends of the shafts 12a, 7a and 9a. In the embodiment, no shaft of the control mechanism is formed on the reinforcement base-plate B, but by forming the shaft adequately, the free ends of those shafts may be supported by the aforementioned 2nd base-plate. The reinforcement base-plate B will be formed with synthetic resin or metal.

Although the shafts 12a, 7a, 6a and 9a are formed integrally with the 2nd base-plate by the use of synthetic resin, a shaft formed separately from the 2nd base-plate 5 may be connected by bonding or plastic deformation. In both cases, by forming at least one part of the 2nd base-plate 5 or the auxiliary base-plate B from synthetic resin, the volume of a connecting portion of shafts can be minimized in comparison with one constructed with metal, and by supporting a free end of each shaft so that mechanical strength will not be reduced even if a shaft fitted in each operating member is made thinner, minimization can be realized.

As it is clear from the foregoing description, in case the 2nd base-plate and the auxiliary base-plate are formed in a multi-purpose shape in one piece arbitrarily, a part or the whole of the operating members of the control mechanism are held to these base-plates. The mechanical strength of their supporting portion is reinforced by two base-plates opposite each other, or the shafts is are inclined due to a lack of strength at their connection or also formed integrally by the use of synthetic resin. Then a deformation or secular (aging) change due to creep characteristics of the shafts can be compensated related to each other by the two base-plates. Thus by attempting to minimize a shutter through making these shafts smaller in diameter and by molding them with synthetic resin, an improvement of lubrication, minimization and a significant reduction of production cost can be realized, so great advantages can be obtained.

What we claim is:

1. A control mechanism for a camera shutter, comprising:
 a first base plate having an exposure aperture therethrough;
 opening and closing means controllable for opening and for closing the exposure aperture;
 a second base plate opposite and spaced from said first base plate and having a first major surface facing said first base plate and a second major surface facing away from said first base plate, said second base plate comprised of synthetic resin and including synthetic resin shafts extending from the second major surface of said second base plate and terminating at respective free ends of said shafts;
 mechanical control means mounted on said second base plate for controlling operation of said opening and closing means and including at least one element mounted on one of said shafts of said second base plate; and
 a metallic auxiliary base plate spaced from the second major surface of said second base plate fixed to the free ends of said shafts of said second base plate for supporting and maintaining the relative positions of said shafts and covering said mechanical control means.

2. A control mechanism for a camera shutter according to claim 1:
 wherein said control means includes at least one movable operating member coactive with said opening and closing means for operating the same; and
 wherein said movable operating member is movably mounted on one of said shafts of said second base plate.

3. A control mechanism for a camera shutter according to claim 1, wherein said control means includes a plurality of movable elements mounted for rotation on respective ones of said shafts of said second base plate.

4. A control mechanism for a camera shutter according to claim 1, wherein said second base plate including said shafts thereof consists essentially of synthetic resin.

* * * * *